Patented Aug. 15, 1939

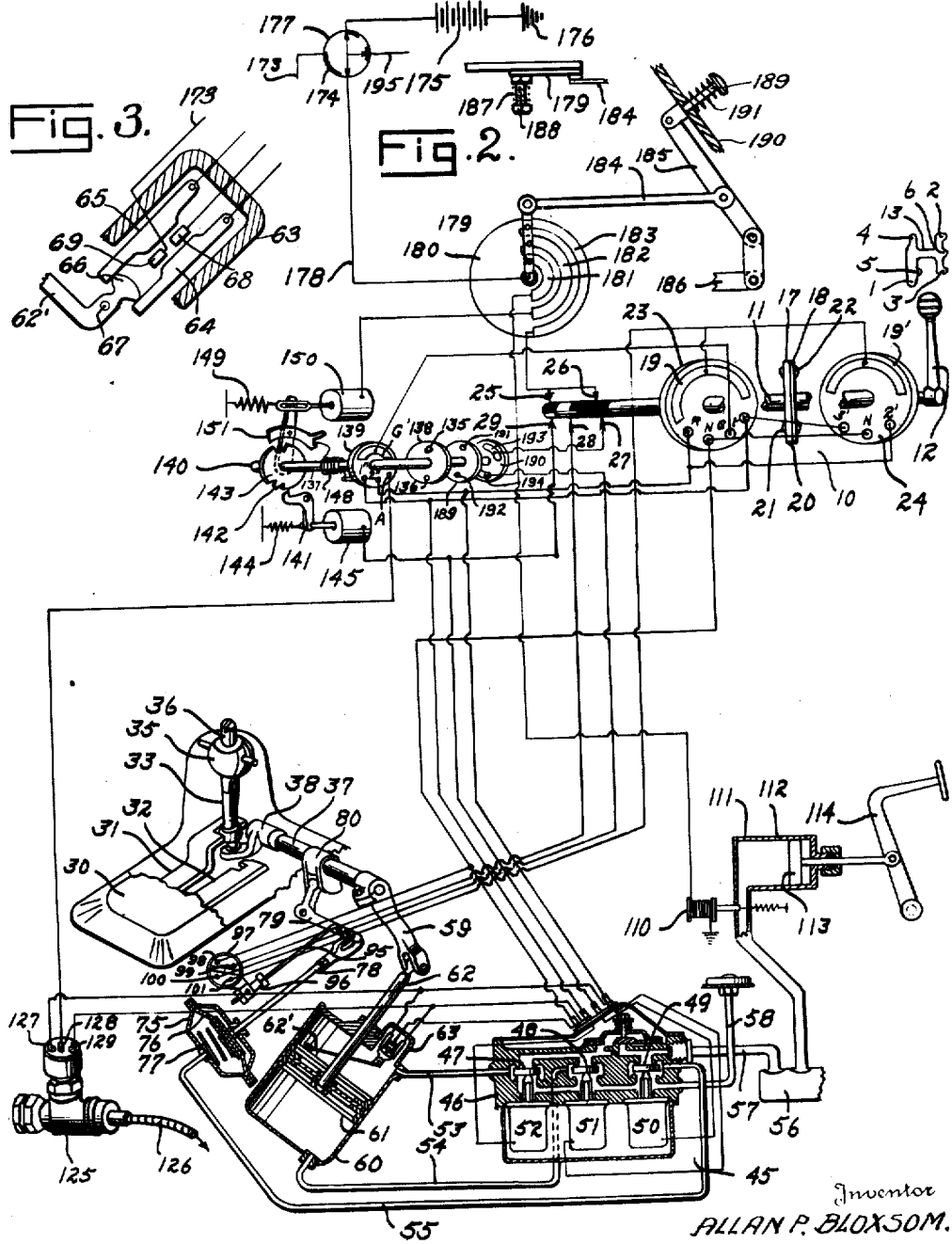

2,169,216

UNITED STATES PATENT OFFICE 2,169,216

ACCELERATOR TIMER CONTROL

Allan P. Bloxsom, Houston, Tex.

Application October 14, 1937, Serial No. 168,997

10 Claims. (Cl. 192—.01)

The invention relates to improvements in apparatus for automatically shifting the change speed gears of a motor vehicle transmission, either conventionally or in accordance with the speed of such vehicle. More particularly, the invention relates to a device in a class described including means for timing the preselection and shifting of gears upon movement of the accelerator pedal.

It is an object of the invention to provide improvement in the construction of gear shift mechanisms disclosed by Harold W. Price in application for United States Letters Patent Serial No. 116,983.

A further object of the invention is to provide simple and effective mechanism whereby the operation of the clutch and the shifting of gears are controlled in proper sequence by the accelerator pedal.

Still another object is to provide in a power operated gear shifting mechanism preselector timing means controlled by the movement of the accelerator pedal for controlling the sequence of events in the gear shifting mechanism.

Still another object is to provide in a device of the class described motor means for establishing setting of the transmission, speed responsive means for controlling the motor means, and an accelerator operated preselection timing switch whereby the proper sequence of operation is assured.

Still another object is to provide a power operated gear shift device including mechanism operable during movement of the ignition switch from the on position for returning the transmission gears to neutral position.

Other objects, together with the foregoing, will become apparent from the following specification considered together with the accompanying drawing in which:

Fig. 1 is a diagrammatic illustration showing all of the essential features of a device comprising the present invention.

Fig. 2 is a detail view showing mechanical features of the preselector timer comprising an element of the invention.

Fig. 3 is an enlarged view of a switch comprising an element of the invention.

The gear shifting mechanism of the present invention is of general utility in variable speed devices but is of particular utility in motor vehicles employing change speed transmissions for transmitting power from the prime mover to the driven elements of the vehicle. The description of the invention will be directed to its use in such environment but it is to be understood that the invention is not confined to such use, reference thereto being made only by way of illustration.

The invention contemplates the use of mechanisms which are instrumental in shifting the gears of a selective speed transmission through their various speed ratios, either conventionally, as by gear shift lever, by a change gear selector switch, or automatically through mechanisms including an accelerator operated switch in conjunction with speed responsive mechanism.

In the drawing a selector switch is generally designated at 10. This switch may be mounted at any convenient point on the vehicle as, for example, the steering column whereby the switch will be readily available for operation by movement of the hand. The switch 10 comprises a shaft 11 upon which is fixed a finger-tip control lever 12 projecting outwardly from the selector switch unit through an H-slot designated as 13 and which is provided with recesses 1 to 6, inclusive. The parts of the switch 10 mounted upon the shaft 11 are shown in open view in order that the construction and operation of this phase of the invention may be made apparent as the description continues. As will more fully appear the switch unit 10 constitutes a manually operated selector switch including a dummy gear shift lever 12, which is selectively movable to various control positions in simulation of the movements of the conventional manually operable gear shift lever.

Recesses 1, 2 and 3 of the H-slot 13, respectively, illustrate the positions of the lever 12 when the gears are to be shifted to low, second, or high speed, while recess 4 illustrates the position of the lever 12 when the gears are to be shifted to reverse. Recess 5 determines the position of the lever 12 when utilizing an automatic shifting of gears through cooperation with speed responsive means as will hereinafter be described.

It will be here noted that the shaft 11 of the selector switch 10 is constantly urged to the right as illustrated in Fig. 1 by means (not shown) and in this manner the lever 12 is retained in any of the recesses 1 to 6 after being manually moved to the desired recess.

As above indicated, the shaft 11 of the selector switch 10 is bodily and angularly movable. Keyed upon shaft 11 is a rotor 20 comprising an insulating disc 17 to which is attached a conducting disc 18 by means of contactor studs 21 and 22 which are thus electrically interconnected. The rotor 20 is positioned between contact carrying discs 23 and 24 which have fixed coaxial positions on opposite sides of the rotor 20. An open view of this construction is shown in the drawing in order to more clearly illustrate the invention and the operation thereof.

The contact disc 23 is provided with contacts 1', G, N, R and 19, and the contact disc 24 is provided with contacts 2', N, 3' and 19'. The contact sectors 19 and 19' are so constructed as to be in contact with stud 22 on the rotor 20, the remaining contacts being so arranged that the stud 21 will contact with a single one of these contacts, depending upon the position of the control lever 12.

The left-end of the shaft 11 is of insulating material except for conducting areas which are adapted to engage the contact members 25, 26, 27, 28 and 29 in a manner that will be further described.

At 30 is illustrated the conventional three speeds forward and reverse transmission through which various speed ratios are selectively provided between the driving rotor and the clutch and drive shaft mechanisms (not shown). The transmission 30 comprises conventional shift rails 31 and 32 adapted to be engaged by lever 33 whereby the desired shift may be effected. Shift rail 31 is provided for the shifting of gears to second and high speeds, while the shift rail 32 is provided for the shifting of gears to low and reverse speeds.

The lever 33 is universally mounted at its upper end 35 within the cover plate of the transmission and has an upward projection 36 whereby a manual shift lever may be detachably secured to the lever 33 in event it is desired for any reason to resort to conventional shifting of gears.

In addition to the indicated modifications of the conventional selective three speed transmission a bodily and angularly movable shaft 37 extends into the transmission housing and is provided with an arm 38 affixed to the end thereof. This arm in turn engages the lower end of the lever 33 in such a manner that angular movement of the shaft 37 will effect longitudinal displacement of one of the shift rails 31 and 32, depending upon the axial position of the shaft 37.

As the invention is particularly directed to the provision of remotely controlled power means for operating a selective speed transmission an essential feature of the invention is the power applying mechanism which comprises a solenoid operated control valve unit generally designated as 45, a power unit comprising a double-ended shift motor 60, and a cross-shift motor 75.

The valve unit 45 preferably comprises a housing 46 in which are positioned valves 47, 48 and 49 connected to plungers which serve as armatures and have a sliding fit within solenoids 52, 51, and 50, secured to the housing 46; the housing 46 is provided with five bosses bored to provide ports which are connected, respectively, to the upper and lower ends of the shift motor 60 by conduits 53 and 54, to the shift motor 75, by the conduit 55, to the intake manifold 56 of the vehicle motor by a conduit 57, and to the atmosphere by a conduit 58.

Through the conduits 53 and 54 motive power is imparted to a piston 61 in the shift motor 60 to reciprocate the piston rod 62 and thereby to rock the arm 59 affixed to the outer end of the shaft 37 whereby there is effected an angular displacement of the latter and the gears are shifted by longitudinal movement of either of the shift rails 31 and 32. The piston 61 is in disconnected engagement with the lever 62' of a switch 63 and serves to actuate contact members 64 and 65 to make and break circuits through fixed contacts 68 and 69, as is best shown in Fig. 3. It is believed apparent that movement of the lever 62' will cause movement of the head 66 about its fulcrum 67, which in turn causes movement of the contact members 64 and 65 whereby desired circuits will be made and broken, as will later be described.

The cross-shift motor 75 is preferably a diaphragm cylinder having a flexible diaphragm 76 normally held in upward position by a pressure spring 77. A rod 78 is connected to the diaphragm 76 and also to a bell crank lever 79, the opposite end of which engages spaced projecting ears on a collar 80 fixed to the shaft 37. With the rod 78 normally urged upwardly, the shaft 37 is normally held in engagement with the shift rail 31, this being the normal neutral position, and hence compares with the normal neutral position of the lever 12 in the recess 6 of the H-slot 13.

A rod 95 is also connected to the bell crank lever 79 and has its opposite end connected through a loose connection 96 to the housing of an interlock switch 97. The loose connection 96 constitutes a time delay connection in that crosswise movement of the cross-shift linkage may be substantially completed before the interlock switch 97 is moved.

The interlock switch 97 comprises a split plate having two insulated sections which make wiping contact with fixed terminals 98, 99, 100 and 101. It is apparent that when the switch 97 is in the position shown in Fig. 1, terminals 98 and 99 are electrically interconnected while terminals 100 and 101 are similarly interconnected.

In order that the power shifting of gears may take place, if desired, in accordance with the speed of the vehicle a governor operated mechanism 125 is connected to the speedometer cable 126. The details of this governor operated switch comprises no part of the present invention. Suffice it to say, that such mechanism is so constructed that at speeds, for example, under fifteen miles per hour, the terminal 127 is connected to the output pole 128, while at speeds above fifteen miles per hour a connection is made between the terminal 129 and the output pole 128.

A further important element of the invention is a progressive ratchet switch 140 which will now be briefly described. This switch is similar in construction to the selector switch 10, already described. The fixed contact carrying disc 139 of the switch 140 is provided with contacts G', 1'' and 2'', which are connected respectively to the contacts G, 1' and R of the selector switch 10, while a fourth terminal A on the disc is connected to the output post 128 of the governor switch 125. A rotor 138, similar to rotor 20 of the selector switch 10, is mounted on the switch shaft 137 and has electrically connected contact studs 135 and 136, the former of which is in constant engagement with contact sector G', while the latter engages one of the remaining contacts, depending upon the switch position. This position is determined by the operation of solenoids 145 and 150 through cooperation with pawls 141 and 151 for engaging toothed disc 143, mounted upon a shaft 137. The pawl 141 is a locking pawl normally urged to locking engagement with the disc 143 by tension spring 144.

For a purpose that will hereafter be made more fully apparent a second rotor 139, similar to rotor 138, is mounted upon the shaft of the progressive ratchet switch 140. This rotor has electrically interconnected contact studs 191 and 192 which are adapted to engage conductor sectors 193 and 194 on a fixed block 195. The respective contact members are so positioned upon the rotor 189 and the block 195 that a circuit is closed therethrough at all times except when the switch shaft is so positioned that an electrical connection is completed through sector G' and contact 1" of the switch.

Energization of the solenoid 145 disengages the locking pawl 141 and hence permits the shaft 137 to be rotated clockwise by a spring 148 to its off position, at which time the stud 136 engages the contact 1" on the disc 139. If, on the other hand, the solenoid 150 is successively energized and de-energized the pawl 151 engages the disc 143 and rotates this disc progressively in a step-by-step manner in a counter-clockwise direction.

The conventional storage battery 175 is grounded at 176 and is connected through the ignition switch 177 and conductor 178 to an arm 179 of a timer switch 180. The arm 179 is connected through a rod 184 to the accelerator pedal 185 which is in turn attached to a button 189 extending upwardly through the floor board 190, and provided with a compression spring 191. By means of this construction the throttle opening is controlled by a connection to the carburetor (not shown) through a link 186. When the accelerator pedal 185 is normally retained in idling position through the influence of the spring 191 the arm 179 contacts sectors 181, 182 and 183 of the timer switch whereby a connection is completed from the battery 175 to such sectors.

It should be noted that these sectors are so constructed that if the accelerator pedal is depressed and the angular position of the arms 179 on the switch 180 is changed the circuits closed by the switch 180 are progressively made and broken to effect desirable functioning of the device of the invention.

As is shown in Fig. 2, arm 179 of switch 180 is resiliently urged toward the switch disc by means of a compression spring 187 mounted upon a supporting axis 188. This construction serves the dual function of maintaining an electric contact between the arm 179 and the sectors 181, 182 and 183 and producing a decelerating and necessary timing effect upon the movement of the arm 179 about its axis 188.

Briefly describing the wire hookup of the elements above described, solenoid 50 of the valve unit 45 is connected to the contact 29 of the selector switch 10 and also to the solenoid 145 of the progressive ratchet switch 140.

Solenoid 51 which controls the shifting of gears to second and reverse speeds is wired to contacts 65 of the switch 63, terminal 127 of the governor operated switch 125 and to the contacts R, 2' and 2", respectively, of the selector and progressive ratchet switches 10 and 140. Solenoid 52 which controls the shifting of gears to low and high speed positions is wired to contact 64 of the switch 63, terminal 129 of the governor operated switch 125 and to terminals 1' and 1", respectively, of the selector and progressive ratchet switches 10 and 140. The neutral contact 68 of switch 63 is wired both to the contact 98 of the interlock switch 97 and to the contact N of the selector switch 10. Contacts 27—28 of the selector switch 10 are wired respectively to the contacts 100 and 99 of the interlock switch 97 and selector contacts 19 and 19' of the selector switch 10 are connected to contact 101 of the interlock switch 97.

Energy from the battery 175 is conducted through the ignition switch 177 to the arm 179 of the timer switch 180 and, when the accelerator pedal 185 is in idling position, to sectors 181, 182 and 183 of the switch. From the sector 181 current is conducted to the solenoid 110 of the clutch releasing mechanism generally designated as 111. Energization of the solenoid 110 serves to connect the intake manifold 56 to the cylinder 112 whereby the clutch pedal 114 is actuated and the clutch is disengaged. From the sector 182 on the timing switch 180 current is conducted to the solenoid 150 of the progressive ratchet switch 140 while current from the sector 183 is conducted to the contacts 25 and 26 of the selector switch 10.

The operation of the device of the invention will be described, first, in connection with a conventional power shifting of the gears 30 by conventional manipulation of the control lever 12 of the selector switch 10.

With the ignition switch 177 on and with the accelerator pedal 185 in retracted position a circuit is established from the battery to the terminals 25 and 26 of the selector switch 10. The gears of the transmission 30 will be in neutral position, but, if desired, the clutch pedal 144 may be depressed manually. The starter switch is then caused to crank the engine whereby a vacuum is made available within the intake manifold 56. This vacuum is utilized for controlling the clutch through the operation of a solenoid actuated valve generally designated as 110 and which may be of any desired construction but is preferably of the type disclosed in my prior Patent No. 1,911,599. The solenoid actuated valve 110, initially energized when the ignition switch 177 is closed, admits vacuum to the cylinder 112 whereby suction is applied to the piston 113 at the instant the engine starts. The operator may now remove his foot from the clutch pedal 114 and in event the clutch pedal was not previously depressed the application of vacuum within the cylinder 112 will cause the clutch pedal 114 to be depressed immediately upon starting of the vehicle motor.

As above stated, the elements of the transmission are at this time in neutral position. The spring 77 of the cross-shift motor 75 biases the lever 83 into engagement with the high and second speed shift rail 31 and shift lever 12 is biased into the neutral position in the recess 6 of the H-slot 13. The interlock switch 97 is also biased by the action of the spring 77 into the position illustrated in the drawing.

Control lever 12 is then shifted transversely of the H-slot 13 to position 1 whereby a circuit is established through contacts 25 and 29 of the selector switch 10 to the cross-shift valve solenoid 50 whereby vacuum is admitted through conduit 55 to the cross-shift motor 75 and the lever 83 is brought into engagement with the low and reverse shift rail 32. A circuit is also made from the battery 175 to the solenoid 52 through contacts 26 and 28 of the selector switch 10, contacts 99 and 101 of the interlock switch 97 and contact sector 19 and contact 1' of the selector switch 10, but energization of the solenoid 52 connects the upper compartment of the shift motor 60 to the intake manifold 56 and the shaft 62 moves upwardly to rotate the shaft 37 counter-clockwise and hence to move shift rail 32 forwardly to shift the gears of the transmission into low speed position. Each time the accelerator pedal 185 is depressed certain of the circuits as above described will be open including the circuit through solenoid 110 of the clutch release mechanism whereby the clutch will be permitted to engage, the movement of the vehicle will be initiated in low speed.

A feature to be here noted is that when the piston 61 is actuated to move either of the shift rails 31 and 32 the lever 62' is actuated to operate switch 63. If, for example, the piston 61 moves upwardly when either first or high gear is established the switch 63 is operated to make a circuit to solenoid 51 by virtue of the engagement of contacts 65 and 66 (see Fig. 3). This feature insures a shift to the neutral position prior to a subsequent gear shift operation.

As the timer switch 180 de-energizes the gear shifting elements when the accelerator pedal is depressed, it is apparent that no operation of the power shifting elements will take place if the position of the gear shift lever 12 is altered while the accelerator pedal 185 is depressed. To shift to second speed, it will be assumed that the lever 12 is shifted to the recess 2 of the H-slot 13 while the accelerator pedal 185 is depressed. The accelerator pedal is then permitted to return to idling position and hence to re-energize the power shifting elements by closure of the switch 180.

A circuit is thus established to the solenoid 51 through contacts 26 and 27 of the selector switch 10, to and through contacts 99 and 101 of the interlock switch 97, thence through contacts 19' and 2' of the selector switch 10 and to the solenoid 51, which will admit vacuum to the lower compartment of the shift motor 60. As the cross-shift solenoid 50 is de-energized a cross-shifting of the shaft 37 will automatically take place under the influence of the spring 77 as the piston 61 moves downwardly.

As this cross-shifting takes place interlock switch 97 will be rotated in a counter-clock direction to the position shown in the drawing, thus establishing a circuit from the battery 175 through switch 180, contacts 26 and 27 of the selector switch 10, to and through contacts 100, 101 of the interlock switch 97 and contacts 19' and 2' of the selector switch 10 to the solenoid 51 whereby the downward movement of the piston 61 of the shift motor 60 is continued to complete the shift to second gear. Depression of the accelerator pedal 185 will then initiate movement of the vehicle in second speed by permitting the clutch to re-engage as explained above in connection with shifting of gears to low speed position.

To shift to high speed, the selector lever 12 is shifted to the recess 3 in the H-slot 13. When the timer switch 180 is closed a circuit is closed through the contacts 26 and 27, thence through interlock switch 97 to sector 19' and contact 3' of selector switch 10. Current is thence conducted to solenoid 52 whereby vacuum is admitted to the upper end of the shift motor 60. Piston 61 hence moves upwardly and rotates shaft 37 in a counter-clockwise direction to move shift rail 31 and enmesh the high speed gears of the transmission 30.

The description will be now directed to the automatic operation of the device of the invention wherein shifting is controlled through utilization of the speed operated switch 125 and the progressive ratchet switch 140.

Closure of the ignition switch 177 will cause current to flow through the conventional ignition equipment through the conductor 195 and will also close a circuit to the timer switch 180, which is operated by the accelerator pedal 185 through rod 184. As the accelerator pedal is moved to its idling position the switch arm 179 makes contact progressively with the sector plates 181, 182 and 183.

Contact with the sector plate 181 causes current to flow therethrough to solenoid 110 whereby the valve to the clutch throughout cylinder 111 is opened and power is admitted to the cylinder to effect disengagement of the clutch. Contact between the arm 179 and the sector 182 energizes the solenoid 150 of the progressive ratchet switch 140 to set the pawl 151 of the progressive ratchet switch in a position to be operated by the spring 149 to move the disc 143 one step in a counter-clockwise direction. By virtue of this function, repeated closures of this circuit will cause a step-by-step rotation of the disc 143 to effect successive contacts between the sector G' and the contacts 1", 2" and A. Energization of solenoid 145 of the progressive ratchet switch withdraws the locking pawl 141 so that the disc 143 is free to rotate in a clockwise direction under the influence of spring 148 to reset the disc 139 in its initial position. Such action also sets the disc 189 so that the contact studs 191 and 192 are disconnected from the sectors 193 and 194 for a purpose that will be made apparent. Contact of the arm 179 with the sector 183 completes an electric connection from the contact points 25 and 26 riding upon the rods 11 of the switch 10.

When lever 12 is moved from position 6, where it ordinarily rests, to the left side of the H-slot 13, the rod 11 is moved to the left so that an electrical connection is made between contacts 25 and 29 and also between contacts 26 and 28. A circuit is thus closed through contacts 25 and 29 to the solenoid 145 which releases the locking pawl 141 to allow the disc 143 to return to its initial position so that the stud 136 engages contact 1". A parallel circuit is also completed from the contact 29 through the cross-shift solenoid 50 whereby vacuum is admitted to the cross-shift motor 45 to pull the cross-shift linkage 37 into contact with the shift rail 32 so that it is in position for a gear shift to first or reverse gear. The interlock switch 97 is moved so that contacts 98 and 100, and 99 and 101, respectively, are interconnected.

A circuit having been closed between contacts 26 and 28, the contact point 99 of interlock switch 97 is energized and current flows through contacts 98 and 101 to sectors 19 and 19' of the selector switch 10.

The foregoing operations take place as the gear lever 12 is moved from its neutral position toward the slot 5. When the lever 12 reaches slot 5 a circuit is made through sector 19 to contact G, thence to a sector G' of the progressive ratchet switch 140. This energizes the contact 1' of the progressive ratchet switch whereby solenoid 52 of the power shifting mechanism is actuated to admit vacuum to the shift motor 60 so that the gears are shifted into first position or low gear.

As the gear shift lever 12 is allowed to drift into the slot 5 the circuit through the contact 28 is broken and a second circuit is established through contact 27 to the sector 193 of the disc 189. The progressive ratchet switch 140 being in the first position no contact is made through the rotor 189 between sectors 193 and 194 and hence current cannot flow by way of the interlock switch to energize the cross-shift solenoid 50 and shift the gears to neutral if the timer switch 180 were left in idling position with arm 179 in contact with the sector 183. The vehicle will therefore proceed in low speed.

The accelerator timer switch being moved again, the progressive ratchet switch 140 is moved to the position 2" by means of spring operating pawl 151 so that a connection is made between G' and 2" whereby solenoid 51 is energized and the gear shift linkage is moved to a neutral position under the influence of spring 77 of the cross-shift motor 75 and thence into second gear by continued operation of the shift motor 60.

The accelerator timer switch being moved again, the progressive ratchet switch is moved to the position A, thus energizing the contact 128 of governor 125. Below fifteen miles per hour, the contact 128 is energized to keep the gears in second position. On the other hand, above this speed the contact 127 is energized to shift the gears to third or high speed when the accelerator pedal 185 is in idling position and the clutch is therefore disengaged.

From the foregoing it will be seen that after the governor position of the progressive ratchet switch 140 is made, selection of gear ratio depends entirely upon the speed of the vehicle; for example, if the accelerator be released at speeds of fifteen miles per hour or less, no gear shift would take place and the vehicle would continue to operate at the previously selected gear ratio.

If, however, the accelerator pedal be released at a speed in excess of fifteen miles per hour the transmission would be shifted and the vehicle would then operate in third or high speed. The device will similarly operate in a reverse manner when changing from high speed to second gear.

With automatic operation of the device as above described the transmission is left in second gear unless provision is made to shift the gears to neutral. Such provision is made by providing the fixed terminal 69 in the switch 63 as best seen in Fig. 3 and connecting such terminal through a conductor 173 to a wiping contact 174 in the ignition switch 177. With this arrangement, when the ignition key is being turned to open the ignition circuit and the shifting control circuits, a circuit is momentarily made from the battery to solenoid 52 and vacuum is admitted to the proper end of the shift motor 60 whereby the shift will be returned to neutral position before the motor is stopped. It is therefore apparent that the gears are automatically returned to the neutral position before subsequent starting of the vehicle motor.

In accordance with the foregoing, the invention provides a power actuated mechanism for operating both the transmission and the clutch of a motor vehicle, such device comprising a single selector switch which may be utilized to pre-select gear changes in a conventional manner or to render such pre-selection automatically, depending upon the speed of the vehicle. In either event the accelerator operated timer switch is instrumental in maintaining the proper timed sequence of operation of the elements of the power shifting device.

What is claimed as new is:

1. In an automotive vehicle having a transmission, a pneumatically operated clutch, a pneumatically operated gear shifter, a selector valve for controlling operation of the shifter, a fuel control element, and means operable by movement of the fuel control element at idling position for timing the operation of the clutch and the selector valve in a manner that the gear shifter is actuated when the clutch is released, said means comprising a sequence switch to open and close a clutch control circuit as the fuel control element is moved respectively to and from idling position.

2. In a device of the class described the combination of a power operated gear shift including a selector switch for controlling the application of power to the shifting mechanism, a power operated clutch, a fuel control element, and switch means operable by the fuel control element for energizing the clutch mechanism prior to closure of the circuit through the selector switch.

3. In an automotive vehicle having a clutch and selective speed transmission, power means for operating the clutch and transmission, electrical control means for said power means, switch means for energizing said control means, and means controlled by said switch means for returning the transmission gears to neutral during the movement of the switch means to the off position.

4. In an automotive vehicle having a clutch and selective speed transmission, power means for operating the clutch and transmission, electrical control means for said power means, switch means associated with the ignition switch of the vehicle for energizing the control means, and means controlled by said switch means for returning the transmission gears to neutral during movement of the ignition switch to the off position.

5. In a device for operating the change speed transmission of a motor vehicle the combination of motor means operable to effect setting of the transmission, speed responsive means operable in accordance with the speed of the vehicle to control said motor means, a power operated clutch, a fuel control element, and means operable during movement of the fuel control element to idling position for energizing the clutch mechanism and thereafter energizing said motor means, said means including a clutch control circuit, a control circuit for said motor means, and a sequence switch connected to the control element and adapted to close said circuits in sequence as the control element moves to idling position.

6. In a gear shifting mechanism for automotive vehicles, power means for releasing the clutch and effecting settings of the transmission, electrical control means for said power means, speed responsive means for energizing said control means in accordance with the speed of the vehicle, a fuel control element and switch means operable by movement of the fuel control element to idling position to close a clutch controlling circuit and to thereafter energize the gear shift power means.

7. In an automotive vehicle having a selective speed transmission, a source of power, a power operated clutch, a power operated gear shifter including a selector valve controlling application of power to the shifter, and a timing unit operatively connected to the accelerator pedal and adapted to move the selector valve in proper relation to application of power to the clutch and the gear shifter.

8. In an automotive vehicle having a transmission, a source of power, a power operated clutch, a power operated gear shifter including a selector valve controlling application of power to the shifter, and a timing unit operatively connected to the accelerator pedal to operate the clutch in proper relation to the application of power to the selector valve and the gear shifter.

9. In an automotive vehicle having a transmission, a source of power, a power operated clutch, a power operated gear shifter including a selector valve controlling application of power to the shifter, and means controlled by ignition switch for application of power to shifter to return the gears to a neutral position.

10. In an automotive vehicle having a transmission, a source of power, a power operated clutch, a power operated gear shifter including a selector valve controlling application of power to the shifter, and a timing unit controlled by the accelerator pedal for correlating position of the clutch, movement of the selector valve from one position to another, and actuation of the gear shifter.

ALLAN P. BLOXSOM.

CERTIFICATE OF CORRECTION.

Patent No. 2,169,216.     August 15, 1939.

ALLAN P. BLOXSOM.

It is hereby certified that error appears in the above numbered patent requiring correction as follows: In the drawing, the portion of Figure 1 showing segments 181, 182 and 183, should appear as shown below instead of as shown in the patent -

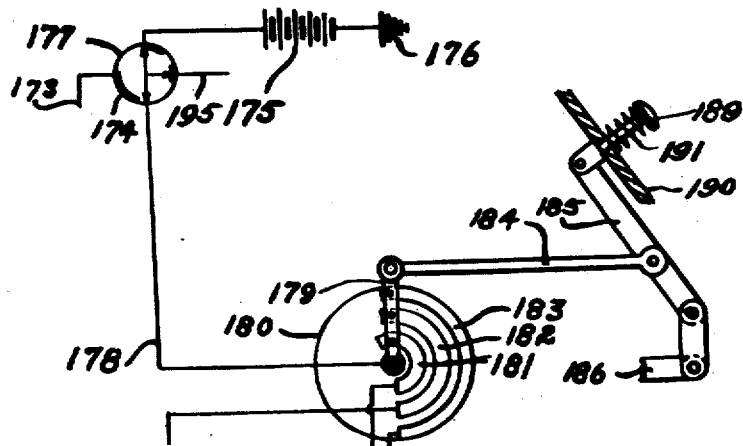

and that the said Letters Patent should be read with this correction therein that the same may conform to the record of the case in the Patent Office.

Signed and sealed this 24th day of October, A. D. 1939.

(Seal)

Henry Van Arsdale,
Acting Commissioner of Patents.

sion, a source of power, a power operated clutch, a power operated gear shifter including a selector valve controlling application of power to the shifter, and a timing unit operatively connected to the accelerator pedal to operate the clutch in proper relation to the application of power to the selector valve and the gear shifter.

9. In an automotive vehicle having a transmission, a source of power, a power operated clutch, a power operated gear shifter including a selector valve controlling application of power to the shifter, and means controlled by ignition switch for application of power to shifter to return the gears to a neutral position.

10. In an automotive vehicle having a transmission, a source of power, a power operated clutch, a power operated gear shifter including a selector valve controlling application of power to the shifter, and a timing unit controlled by the accelerator pedal for correlating position of the clutch, movement of the selector valve from one position to another, and actuation of the gear shifter.

ALLAN P. BLOXSOM.

CERTIFICATE OF CORRECTION.

Patent No. 2,169,216.  August 15, 1939.

ALLAN P. BLOXSOM.

It is hereby certified that error appears in the above numbered patent requiring correction as follows: In the drawing, the portion of Figure 1 showing segments 181, 182 and 183, should appear as shown below instead of as shown in the patent -

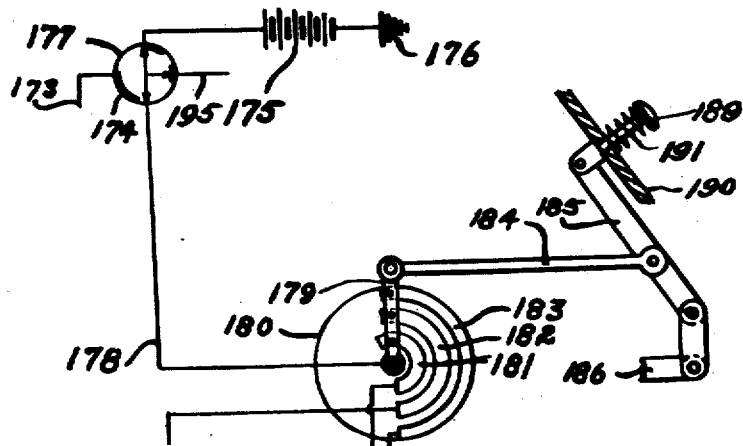

and that the said Letters Patent should be read with this correction therein that the same may conform to the record of the case in the Patent Office.

Signed and sealed this 24th day of October, A. D. 1939.

(Seal)

Henry Van Arsdale,
Acting Commissioner of Patents.